(12) United States Patent
Taguchi et al.

(10) Patent No.: US 11,884,454 B2
(45) Date of Patent: Jan. 30, 2024

(54) BINDER

(71) Applicant: MAX CO., LTD., Tokyo (JP)

(72) Inventors: Satoshi Taguchi, Tokyo (JP); Hajime Takemura, Tokyo (JP)

(73) Assignee: Max Co., Ltd., Tokyo (JP)

( * ) Notice: Subject to any disclaimer, the term of this patent is extended or adjusted under 35 U.S.C. 154(b) by 836 days.

(21) Appl. No.: 16/966,301

(22) PCT Filed: Jan. 22, 2019

(86) PCT No.: PCT/JP2019/001791
§ 371 (c)(1),
(2) Date: Jul. 30, 2020

(87) PCT Pub. No.: WO2019/155863
PCT Pub. Date: Aug. 15, 2019

(65) Prior Publication Data
US 2020/0369436 A1 Nov. 26, 2020

(30) Foreign Application Priority Data

Feb. 9, 2018 (JP) .................. 2018-022389

(51) Int. Cl.
B65D 33/16 (2006.01)
B65D 33/30 (2006.01)
B65B 13/34 (2006.01)
B65B 51/08 (2006.01)

(52) U.S. Cl.
CPC .............. B65D 33/30 (2013.01); B65B 13/34 (2013.01); B65B 51/08 (2013.01)

(58) Field of Classification Search
CPC .......... B65D 33/30; B65B 13/34; B65B 51/08
See application file for complete search history.

(56) References Cited

U.S. PATENT DOCUMENTS

| 912,955 | A | * | 2/1909 | Harber | .................... F16L 33/03 24/19 |
| 2,682,054 | A | * | 6/1954 | Lindstrom | ............ B25C 5/0285 29/243.57 |
| 2,855,647 | A | * | 10/1958 | Smith | ................ B65D 33/1641 24/DIG. 11 |

(Continued)

FOREIGN PATENT DOCUMENTS

| CN | 1918037 A | 2/2007 |
| DE | 19527875 A1 | 1/1997 |

(Continued)

OTHER PUBLICATIONS

Extended European Search Report for 19751173.6 dated Oct. 8, 2021. (6 pp.).

(Continued)

Primary Examiner — Jason W San
(74) Attorney, Agent, or Firm — Banner & Witcoff, Ltd.

(57) ABSTRACT

A binding tool includes a pair of leg portions and a central portion that is provided between the pair of leg portions. The binding tool is formed in a horseshoe shape and is capable of binding an object to be bound by bending the pair of leg portions inward. The pair of leg portions are arranged to be deviated from each other in a front-rear direction as viewed in a thickness direction.

19 Claims, 14 Drawing Sheets

(56) References Cited

U.S. PATENT DOCUMENTS

| | | | | |
|---|---|---|---|---|
| 3,055,010 | A * | 9/1962 | Maestri | B65B 51/04 29/243.57 |
| 3,078,533 | A | 2/1963 | Allen | |
| 3,400,433 | A * | 9/1968 | Klenz | B65D 33/1641 24/30.5 W |
| 3,541,647 | A * | 11/1970 | Marietta, Jr. | B65D 33/1641 24/30.5 W |
| 3,564,663 | A * | 2/1971 | Roberts | B65D 33/1641 24/30.5 W |
| 3,584,347 | A * | 6/1971 | Klenz | B65D 33/1641 24/30.5 W |
| 4,131,975 | A * | 1/1979 | Niedecker | B65D 33/1641 24/30.5 W |
| 4,166,571 | A * | 9/1979 | Niedecker | B65D 33/1641 411/476 |
| 4,525,898 | A * | 7/1985 | Gallion | B65D 33/1641 24/30.5 R |
| 4,949,428 | A * | 8/1990 | Simon | A22C 11/125 24/30.5 R |
| 5,247,723 | A * | 9/1993 | Niedecker | B65D 33/1641 24/30.5 W |
| 5,953,794 | A * | 9/1999 | Hanten | B65D 33/1641 24/30.5 R |
| 6,401,306 | B1 * | 6/2002 | Hanten | B65D 33/1641 24/30.5 R |
| 8,266,771 | B2 * | 9/2012 | Scott, Jr. | E04H 17/124 403/392 |
| 2007/0261367 | A1 | 11/2007 | Kobayashi | |
| 2020/0031508 | A1 * | 1/2020 | Takemura | B65B 13/185 |
| 2020/0354096 | A1 * | 11/2020 | Takemura | B65B 13/345 |
| 2020/0369436 | A1 * | 11/2020 | Taguchi | B65D 33/30 |

FOREIGN PATENT DOCUMENTS

| | | |
|---|---|---|
| JP | H11-103519 A | 4/1999 |
| JP | 2002-332015 A | 11/2002 |
| JP | 2003-054519 A | 2/2003 |
| JP | 2004-010125 A | 1/2004 |
| JP | 2004-067199 A | 3/2004 |
| JP | 2005-067663 A | 3/2005 |

OTHER PUBLICATIONS

International Search Report and Written Opinion issued in Application No. PCT/JP2019/001791, dated Mar. 19, 2019 (8 pages).

* cited by examiner

BINDER

CROSS REFERENCE TO RELATED APPLICATION

This application is a 35 U.S.C. 371 National Phase Entry Application from PCT/JP2019/001791, filed Jan. 22, 2019, which claims priority to Japanese Patent Application No. 2018-022389, filed Feb. 9, 2018, the disclosures of which are incorporated herein in their entirety by reference, and priority is claimed to each of the foregoing.

TECHNICAL FIELD

The present invention relates to a binding tool configured to bind a bag mouth portion, a cable, and the like.

BACKGROUND ART

As a binding tool configured bind a bag mouth portion, a cable, and the like, there is a U-shaped binding tool as disclosed in Patent Literature 1. With respect to such a conventional binding tool 30, as illustrated in FIGS. 14A to 14C, a pair of leg portions 31 thereof are bent inward after an object to be bound 22 is inserted between the pair of leg portions 31, so that the pair of leg portions 31 surround and bind the object to be bound 22. At this time, the pair of leg portions 31 bent inward are deformed to twist in a spiral shape so as not to interfere with each other. In other words, the pair of leg portions 31 are obliquely deformed so as to pass each other.

CITATION LIST

Patent Literature

Patent Literature 1: JP-A-2004-10125

SUMMARY OF INVENTION

Technical Problem

However, in a case where the binding is performed using the conventional binding tool as described above, tips of the leg portion spread since a force to twist the leg portions is applied. In particular, in a case where the object to be bound is thin, the tips of the leg portions may largely spread in an axial direction of the object to be bound, presenting an obstacle.

In addition, since the binding is performed by deforming the pair of leg portions obliquely, the leg portions after binding are in an inclined state with respect to the object to be bound. For this reason, the binding tool after the binding may rotate and deviate from an engaging position or an inner diameter may spread due to change of inclination of the leg portions, resulting in an unstable binding.

Therefore, an object of the present invention is to provide a binding tool capable of performing binding stably, with leg portions thereof not presenting an obstacle even in a case where the object to be bound is thin.

Solution to Problem

The present invention has been made in order to solve the problems described above. The present invention provides a binding tool including: a pair of leg portions, and a central portion that is provided between the pair of leg portions. The binding tool is formed in a horseshoe shape and is capable of binding an object to be bound by bending the pair of leg portions inward. The pair of leg portions are arranged to be deviated from each other in a front-rear direction as viewed in a thickness direction.

Advantageous Effects of Invention

The present invention is as described above, and the pair of leg portions are arranged to be shifted in the front-rear direction. When binding is performed using such a binding tool, the leg portions can pass each other even without being deformed obliquely (even if the leg portions are deformed, a deformation amount can be reduced as compared with that of a binding tool in the related art) since the leg portions are originally deviated from each other in the front-rear direction.

Therefore, the tips of the obliquely deformed leg portions can be prevented from spreading. In particular, even when the object to be bound is thin, the tips of the leg portions do not spread in an axial direction of the object to be bound, and thus do not present an obstacle.

Further, since the leg portions after binding are not in an inclined state with respect to the object to be bound (the leg portions after binding are substantially perpendicular to an axis of the object to be bound), deviation is less likely to occur after the binding, and the binding can be stabilized.

Moreover, since it is unnecessary to deform the leg portions to twist obliquely, the binding can be performed with a smaller force.

DESCRIPTION OF EMBODIMENTS

Figure 1A:
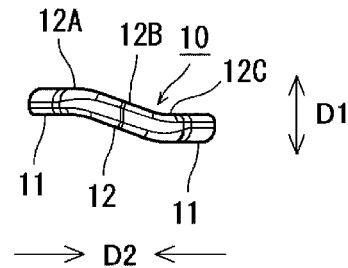
FIG. 1A is a plan view of a binding tool.
Figure 1B:
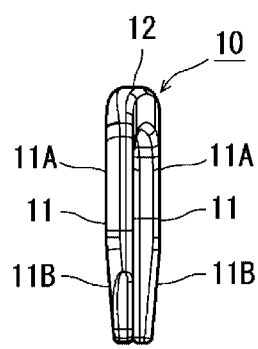
FIG. 1B is a left side view thereof.

Embodiments of the present invention will be described with reference to the drawings.

A binding tool 10 according to the present embodiment is formed of a plastically deformable material. The binding tool 10 is used for binding of a harness, binding of a bag mouth, binding of a field line, binding of an inducing cord, and the like. As the harness, a harness used for an electric wire, such as a wire harness and a cable harness is exemplified.

The binding tool 10 is used by being attached to a binding machine (not illustrated). The binding machine is configured as described in, for example, Patent Literature 1, and includes a driver and a clincher. The binding machine can drive the binding tool 10 toward the clincher by driving the driver. Of the binding tool 10 driven by the driver, a pair of leg portions 11 are pressed by the clincher and bent inward. The pair of leg portions 11 that are bent and deformed surround and hold an object to be bound 22 from both sides.

As illustrated in FIGS. 1A to 1F, the binding tool 10 according to the present embodiment is a horseshoe-shaped member including the pair of leg portions 11 and a central portion 12 provided between the pair of leg portions 11. That is, the binding tool 10 has a substantially U-shaped cross section. The binding tool 10 is capable of binding the object to be bound 22 by bending the pair of leg portions 11 inward.

The pair of leg portions 11 are in shapes inverted from each other, and are formed to have a same thickness and a same length. The pair of leg portions 11 are disposed so as to face each other, and form an opening for inserting the object to be bound 22 therebetween. As illustrated in FIG. 1C, a gap between the pair of leg portions 11 gradually increases toward the opening (in a lower direction in FIG. 1C). Therefore, the opening also gradually widens in the lower direction in FIG. 1C.

Each leg portion 11 includes a root portion 11A that is continuous with the central portion 12, and a tip portion 11B that is continuous with the root portion 11A.

The root portion 11A is formed to have a substantially constant width and thickness.

On the other hand, the tip portion 11B is formed so as to gradually become thinner toward a tip thereof. Further, the tip portion 11B is formed so as to gradually decrease in thickness toward the tip thereof.

The central portion 12 is a portion that connects the pair of leg portions 11. The central portion 12 according to the present embodiment is formed in a semicircular arc shape.

Figure 1C:
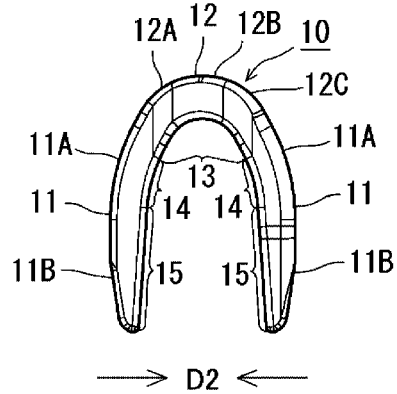
FIG. 1C is a front view thereof.
Figure 1D:
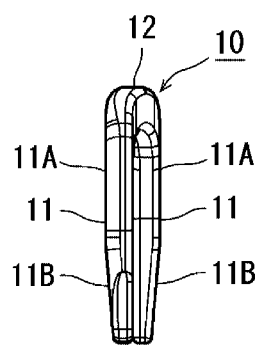
FIG. 1D is a right side view thereof.

As illustrated in FIG. 1A, the central portion 12 includes an inclined portion 12B, one end portion 12A that is continuous from one end portion of the inclined portion 12B, and the other end portion 12C that is continuous from the other end portion of the inclined portion 12B.

The one end portion 12A connects one leg portion 11 of the pair of leg portions 11. The other end portion 12C connects the other leg portion 11 of the pair of leg portions 11. The one end portion 12A and the other end portion 12C extend in parallel to each other.

As illustrated in a plan view of FIG. 1A, the inclined portion 12B extends obliquely with respect to the one end portion 12A and the other end portion 12C. Accordingly, the one end portion 12A, the inclined portion 12B, and the other end portion 12C are connected in a stepped manner. In this way, with the central portion 12, a step is formed such that the pair of leg portions 11 are alternately arranged by displacing one leg 11 and the other leg 11 from each other as illustrated in the plan view. In other words, the central portion 12 extends obliquely with respect to a thickness direction D1 and a bending direction D2 (described below) of the pair of leg portions 11.

Therefore, one end portion 12A side and the other end portion 12C side of the central portion 12 are asymmetrical to each other. In other words, the binding tool 10 according to the present embodiment has a shape in which the central portion 12 connects the pair of leg portions 11 in a non-axisymmetric manner (the binding tool 10 has a shape that is not in axial symmetry when a straight line passing through the middle of the central portion 12 is taken as an axis).

Figure 1E:
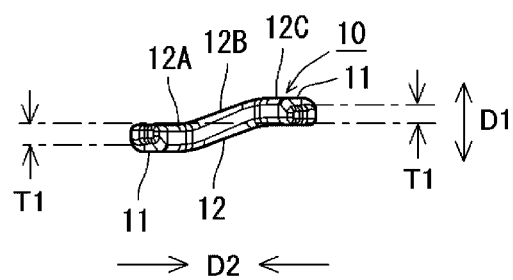
FIG. 1E is a bottom view thereof.
Figure 1F:
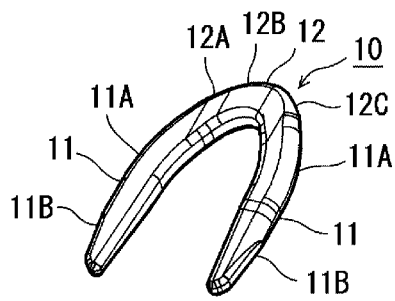
FIG. 1F is a perspective view thereof.

With such a configuration, as illustrated in FIG. 1E, the pair of leg portions 11 are arranged to be deviated from each other in the front-rear direction as viewed in the thickness direction D1. The thickness direction D1 is a perpendicular direction with respect to two mutually parallel planes that are assumed to sandwich the binding tool 10 and that have a minimum distance therebetween.

More specifically, as illustrated in FIGS. 1A to 1F, the pair of leg portions 11 are arranged to be deviated from each other in the front-rear direction (in the thickness direction D1) by a thickness T1 of the tips of the pair of leg portions 11. Therefore, when viewed in the bending direction D2 of the pair of leg portions 11, the tips of the pair of leg portions 11 are offset (deviated) so as not to overlap each other. The bending direction D2 of the pair of leg portions 11 is a direction (a left-right direction in FIG. 1C) perpendicular with respect to the thickness direction D1.

In the present embodiment, the pair of leg portions 11 are deviated in the front-rear direction by the thickness T1 of the tip, but the present invention is not limited thereto, and the pair of leg portions 11 may be arranged to be deviated from each other in the front-rear direction by a distance larger than the thickness T1 of the tip.

When binding is performed using such a binding tool 10, the pair of leg portions 11 are originally deviated from each other in the front-rear direction. Therefore, as illustrated in FIGS. 2A to 2C and FIGS. 3A to 3C, the pair of leg portions 11 can pass each other without being deformed obliquely.

That is, even when the pair of leg portions 11 are bent perpendicularly to the thickness direction D1 (in the bending direction D2), the tips of the pair of leg portions 11 do not interfere with each other.

Therefore, the tips of the obliquely deformed leg portions 11 can be prevented from spreading. In particular, even when the object to be bound 22 is thin, the tips of the leg portion 11 do not spread in the axial direction of the object to be bound 22, and thus do not present an obstacle.

Figure 2A:
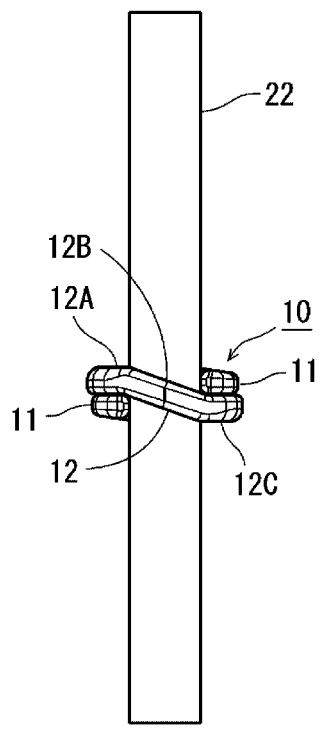
FIG. 2A is a plan view of a state where a thin object to be bound is bound by a binding tool.
Figure 2B:
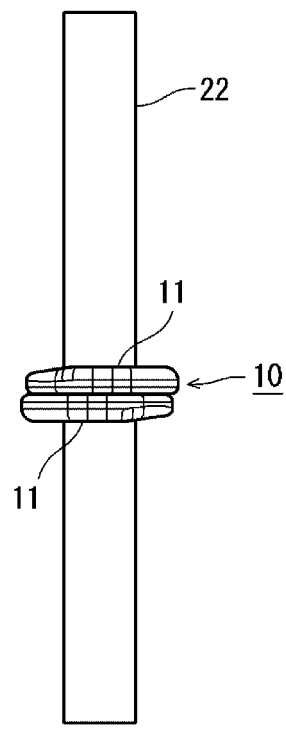
FIG. 2B is a bottom view thereof.

Further, as illustrated in FIG. 2B, since the leg portions 11 after binding are not in an inclined state with respect to the object to be bound 22 (the leg portions 11 after binding are substantially perpendicular to the axis of the object to be bound 22), deviation is less likely to occur after the binding, and the binding can be stabilized.

Further, since it is unnecessary to deform the leg portions 11 to twist obliquely, the binding can be performed with a smaller force. For example, it is possible to reduce power consumption of a binding machine that drives the binding tool 10.

The binding tool 10 according to the present embodiment is formed such that an inner side surface thereof that comes into contact with the object to be bound 22 has an inflection point. That is, the inner side surface of the binding tool 10 is formed by connecting a plurality of curved portions having different curvatures.

Specifically, as illustrated in FIG. 1C, the binding tool 10 according to the present embodiment includes a first curved portion 13 formed on an inner side of the central portion 12, a second curved portion 14 formed to be continuous with both sides of the first curved portion 13, and a third curved portion 15 formed to be continuous with the second curved portion 14. In the present embodiment, the second curved portion 14 is formed on an inner side of the root portion 11A, and the third curved portion 15 is formed on an inner side of the tip portion 11B.

The first curved portion 13 has a larger curvature than the second curved portion 14. The second curved portion 14 has a larger curvature than the third curved portion 15. Therefore, a curvature of an inner side of the leg portion 11 gradually decreases as approaching the opening. "The curvature is large" is the same meaning as "the curvature radius is small" and "the degree of bending is tight (sharp). The third curved portion 15 having a smallest curvature may have a curvature of "0", that is, may be formed to be straight.

Further, as illustrated in FIG. 1C, the third curved portion 15 is formed to be longer than the second curved portion 14. In other words, a distance from an inflection point (boundary) between the second curved portion 14 and the third curved portion 15 to an inflection point (boundary) between the first curved portion 13 and the second curved portion 14 is shorter than a distance from the inflection point (boundary) between the second curved portion 14 and the third curved portion 15 to the tip of the leg portion 11.

As described, by providing the inflection point on an inner side surface of the leg portion 11 which comes into contact with the object to be bound 22, the opening is reduced in a stepwise manner, so that it is possible to correspond to the object to be bound 22 that is wide in size.

Figure 2C:
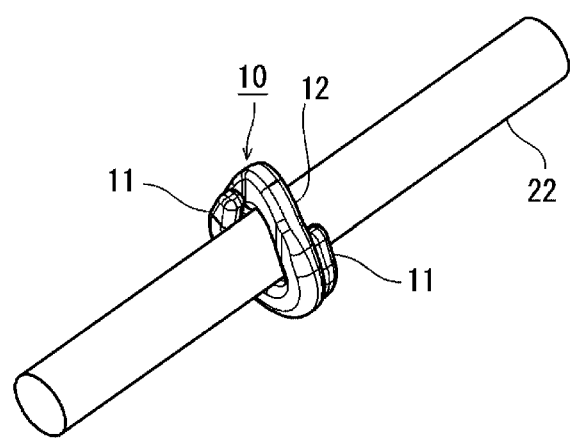
FIG. 2C is a perspective view thereof.

That is, in a case of a thin object to be bound 22 as illustrated in FIGS. 2A to 2C, since the first curved portion 13 having a large curvature is along the object to be bound 22, the binding tool 10 can firmly hold the object to be bound 22.

Figure 3A:
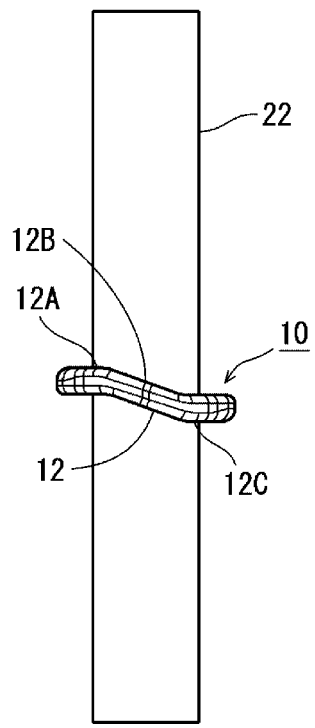
FIG. 3A is a plan view of a state where a thick object to be bound is bound by a binding tool.
Figure 3B:
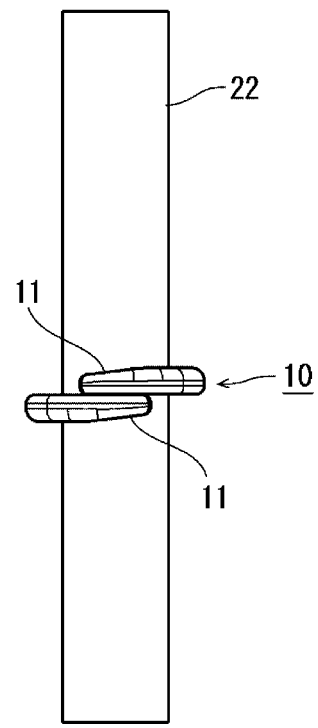
FIG. 3B is a bottom view thereof.
Figure 3C:
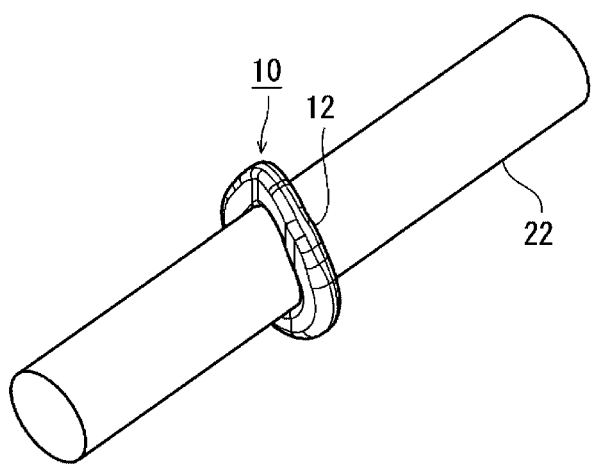
FIG. 3C is a perspective view thereof.

Further, in a case of a thick object to be bound 22 as illustrated in FIGS. 3A to 3C, since the second curved portion 14 having a relatively small curvature can be disposed along the object to be bound 22, the binding tool 10 can firmly hold the object to be bound 22.

Figure 4A:
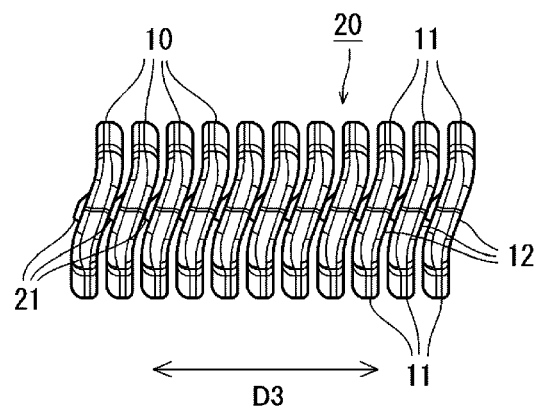
FIG. 4A is a plan view of a coupled binding tool.
Figure 4B:
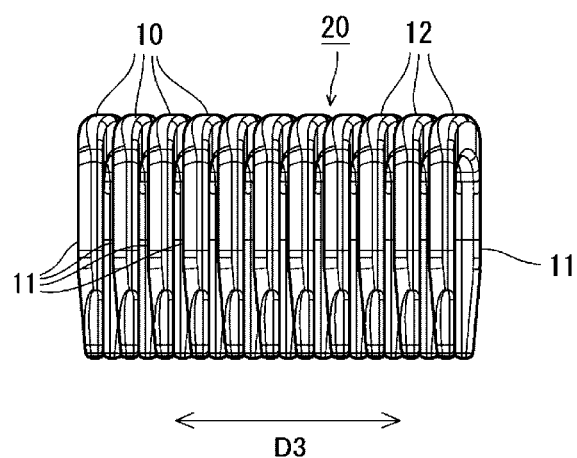
FIG. 4B is a side view thereof.
Figure 4C:
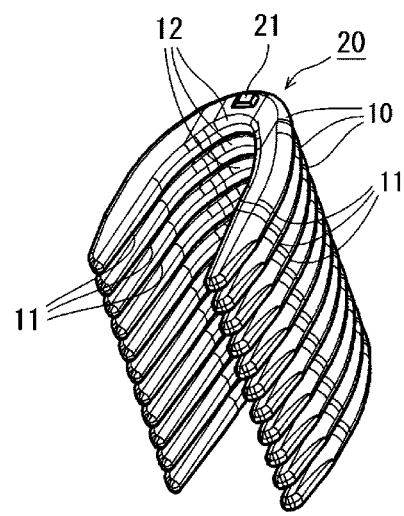
FIG. 4C is a perspective view thereof.
Figure 5A:
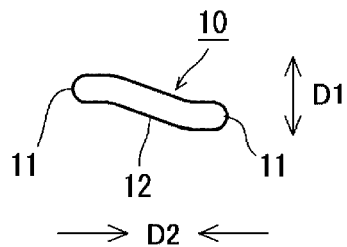
FIG. 5A is a plan view of a binding tool according to a first modification.
Figure 5B:
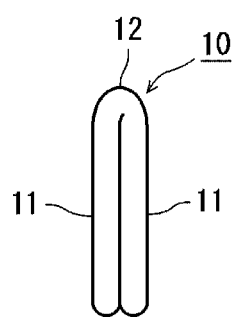
FIG. 5B is a left side view thereof.
Figure 5C:
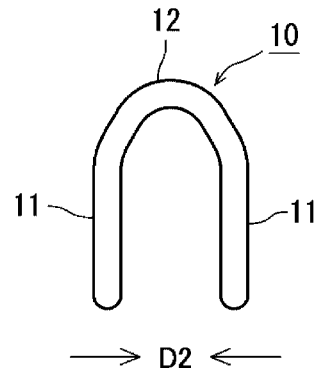
FIG. 5C is a front view thereof.
Figure 5D:
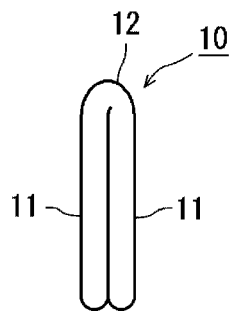
FIG. 5D is a right side view thereof.
Figure 5E:
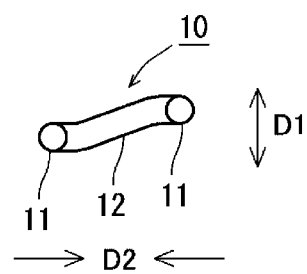
FIG. 5E is a bottom view thereof.
Figure 5F:
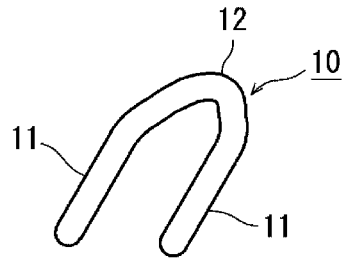
FIG. 5F is a perspective view thereof.
Figure 6A:
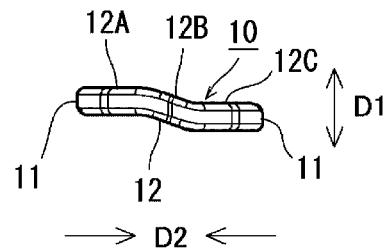
FIG. 6A is a plan view of a binding tool according to a second modification.
Figure 6B:
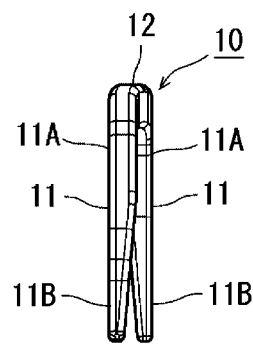
FIG. 6B is a left side view thereof.
Figure 6C:
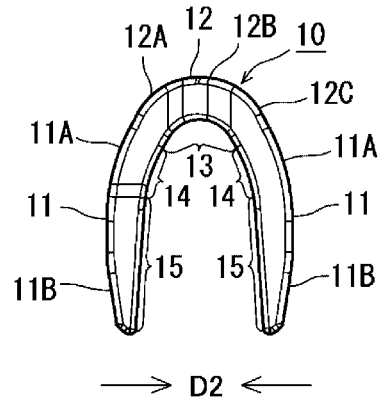
FIG. 6C is a front view thereof.
Figure 6D:
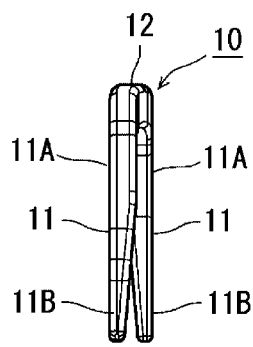
FIG. 6D is a right side view thereof.
Figure 6E:
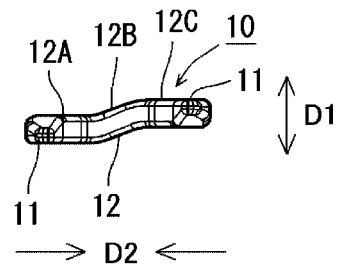
FIG. 6E is a bottom view thereof.
Figure 6F:
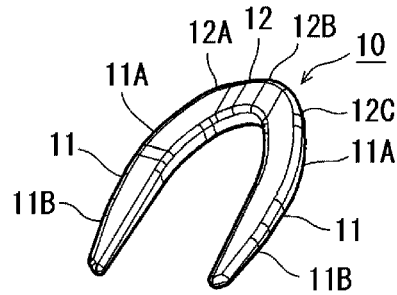
FIG. 6F is a perspective view thereof.

The binding tool 10 as described above may be provided as a coupled binding tool 20 as illustrated in FIGS. 4A to 4C. The coupled binding tool 20 is formed by linearly coupling a plurality of binders 10 using a coupling portion 21. The coupling portion 21 according to the present embodiment is a convex portion provided on a surface of the central portion 12 of the binding tool 10, and connects adjacent binders 10. The coupling portion 21 is formed so as to be easily broken. The coupled binding tool 20 is set in the binding machine in a coupled state. Further, when a leading binding tool 10 is driven by the driver, the coupling portion 21 is broken, and the binding tool 10 is separated from the coupled binding tool 20.

In the present embodiment, a coupling direction D3 of the binding tool 10 is a direction same as the thickness direction D1 of the binding tool 10. Therefore, as illustrated in FIG. 4A, the pair of leg portions 11 of the binding tool 10 are arranged to be deviated from each other in the front-rear direction even when viewed in the coupling direction D3. The coupled binding tool 20 is formed asymmetrically as viewed in the coupling direction D3.

According to such a configuration, it is possible to provide the coupled binding tool 20 in which the binders 10 as described above are compactly coupled.

First Modification

FIGS. 5A to 5F illustrate a binding tool 10 according to a first modification. The binding tool 10 according to the first modification is formed such that a cross-section of the leg portion 11 and the central portion 12 is circular.

Also in the binding tool 10 according to the first modification, the central portion 12 extends obliquely with respect to the bending direction D2 of the pair of leg portions 11, and a step is formed such that the pair of leg portions 11 are alternately arranged by displacing one leg 11 and the other leg 11 from each other as illustrated in the plan view. Further, the pair of leg portions 11 are arranged to be deviated from each other in the front-rear direction as viewed in the thickness direction D1. Therefore, even when binding is performed using such a binding tool 10, the same effect as that of the above-described embodiment can be obtained.

Second Modification

FIGS. 6A to 6F and FIGS. 7A to 7C illustrate a binding tool 10 according to the second modification. In the binding tool 10 according to the second modification, deviation of the pair of leg portions 11 in the thickness direction D1 is set to be slight as compared with that of the embodiment described above. The thickness T1 of the tips of the pair of leg portions 11 is smaller as compared with that of the embodiment described above.

Figure 7A:
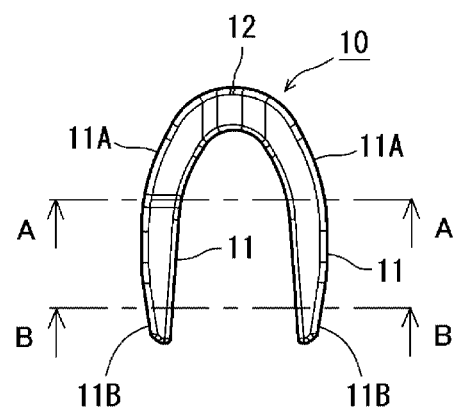
FIG. 7A is the front view of the binding tool according to the second modification.
Figure 7B:
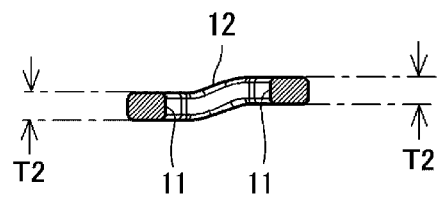
FIG. 7B is a cross-sectional view thereof taken along a line A-A in FIG. 7A.
Figure 7C:
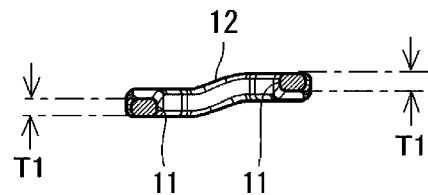
FIG. 7C is a sectional view thereof taken along a line B-B in FIG. 7A.
Figure 8A:
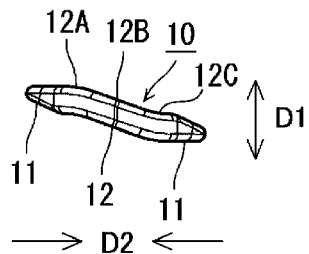
FIG. 8A is a plan view of a binding tool according to a third modification.
Figure 8B:
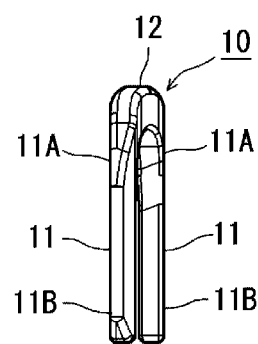
FIG. 8B is a left side view thereof.
Figure 8C:
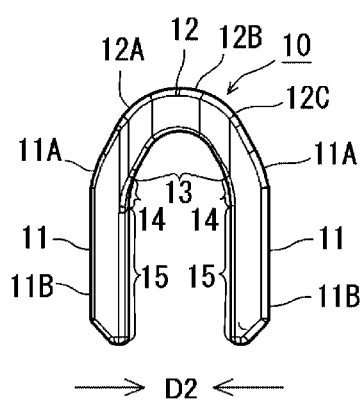
FIG. 8C is a front view thereof.
Figure 8D:
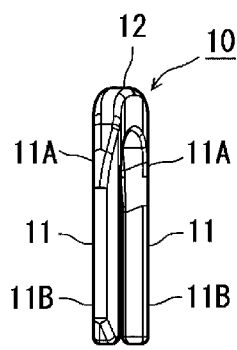
FIG. 8D is a right side view thereof.
Figure 8E:
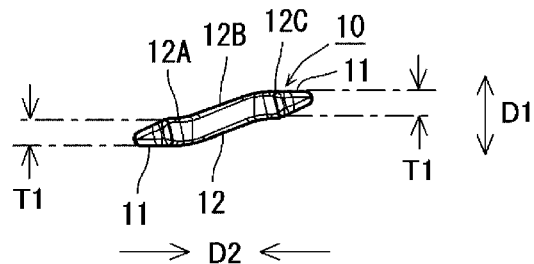
FIG. 8E is a bottom view thereof.
Figure 8F:
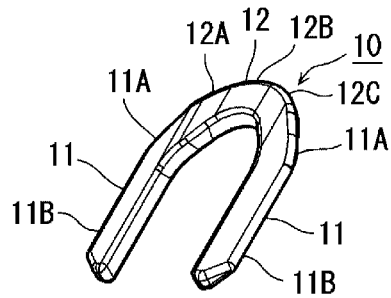
FIG. 8F is a perspective view thereof.
Figure 9A:
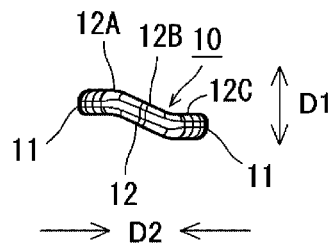
FIG. 9A is a plan view of a binding tool according to a fourth modification.
Figure 9B:
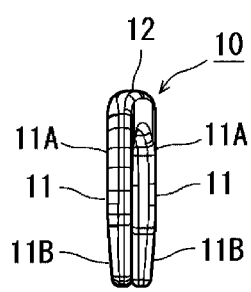
FIG. 9B is a left side view thereof.
Figure 9C:
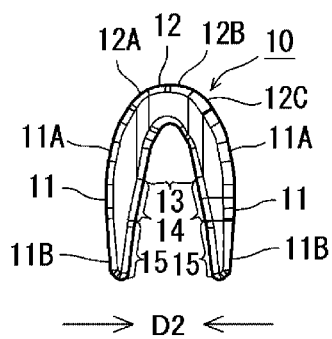
FIG. 9C is a front view thereof.
Figure 9D:
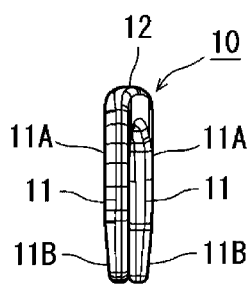
FIG. 9D is a right side view thereof.
Figure 9E:
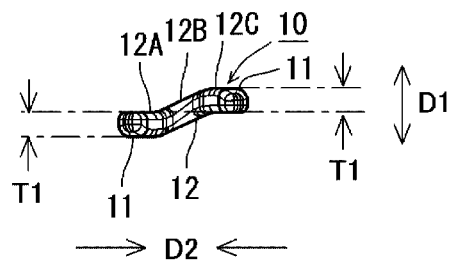
FIG. 9E is a bottom view thereof.
Figure 9F:
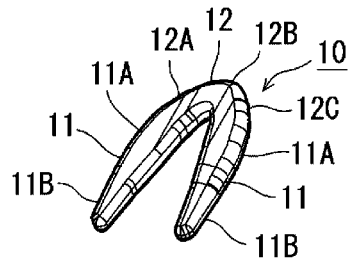
FIG. 9F is a perspective view thereof.
Figure 10A:
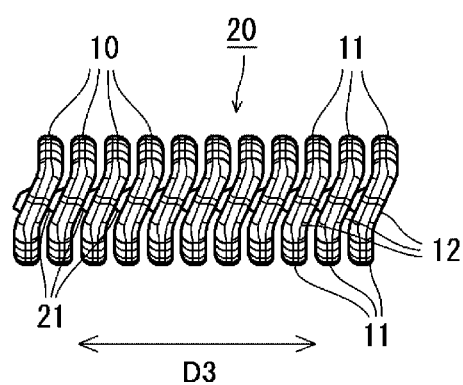
FIG. 10A is a plan view of a coupled binding tool according to the fourth modification.
Figure 10B:
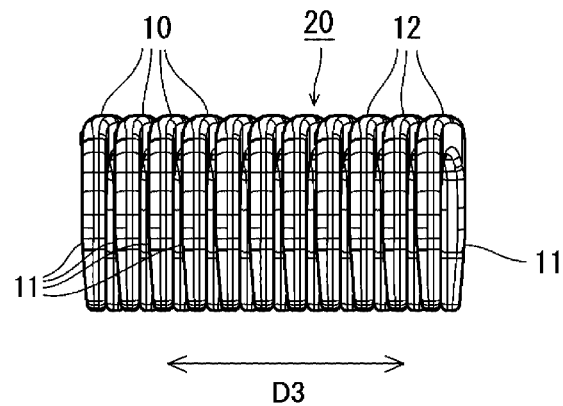
FIG. 10B is a side view thereof.

Specifically, as illustrated in FIG. 7B, the deviation of the pair of leg portions 11 in the thickness direction D1 is less than a thickness T2 of a root of the leg portion 11 and more than the thickness T1 of the tip of the leg portion 11.

Therefore, although the pair of leg portions 11 are deviated in the thickness direction D1, at least portions of the pair of leg portions 11 overlap each other in the thickness direction D1.

Even in a case of such a configuration, the pair of leg portions 11 are formed to be offset (deviated from each other) so that the tips do not interfere with each other when the leg portions 11 are bent inward. Therefore, even when binding is performed using such a binding tool 10, the same effect as that of the above-described embodiment can be obtained.

Third Modification

FIGS. 8A to 8F illustrate a binding tool 10 according to a third modification. The binding tool 10 according to the third modification includes a leg portion 11 having a shape different from that of the above-described embodiment.

Also in the binding tool 10 according to the third modification, the central portion 12 extends obliquely with respect to the thickness direction D1 and the bending direction D2 of the pair of leg portions 11, and a step is formed such that the pair of leg portions 11 are alternately arranged by displacing one leg 11 and the other leg 11 from each other as illustrated in the plan view. Further, the pair of leg portions 11 are arranged to be deviated from each other in the front-rear direction as viewed in the thickness direction D1. Therefore, even when binding is performed using such a binding tool 10, the same effect as that of the above-described embodiment can be obtained.

Fourth Modification

FIGS. 9A to 9F and FIGS. 10A and 10B illustrate a binding tool 10 according to a fourth modification. The binding tool 10 according to the fourth modification is obtained by reducing a size of the binding tool 10 according to the above-described embodiment. Even when binding is performed using the binding tool 10 according to the fourth modification, the same effect as that of the above-described embodiment can be obtained.

Fifth Modification

FIGS. 11A to 13E illustrate a binding tool 10 according to a fifth modification. The binding tool 10 according to the fifth modification is characterized in that a pair of ribs 16 are provided on an inner side thereof.

Figure 11A:
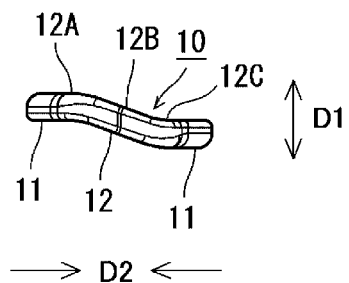
FIG. 11A is a plan view of a binding tool according to a fifth modification.
Figure 11B:
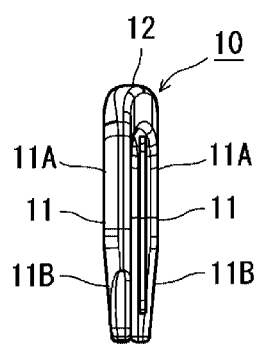
FIG. 11B is a left side view thereof.
Figure 11C:
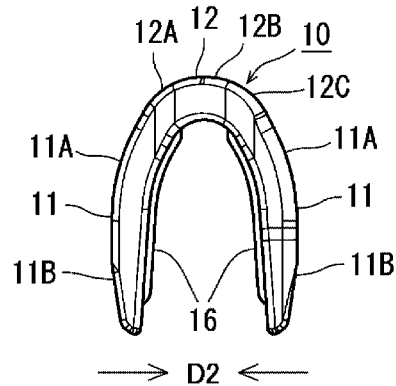
FIG. 11C is a front view thereof.
Figure 11D:
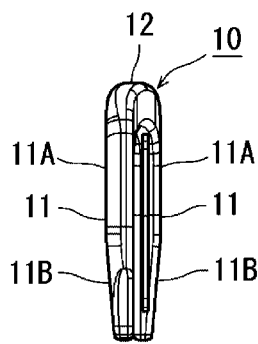
FIG. 11D is a right side view thereof.
Figure 11E:
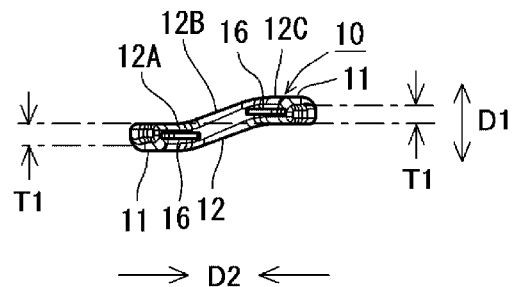
FIG. 11E is a bottom view thereof.
Figure 11F:
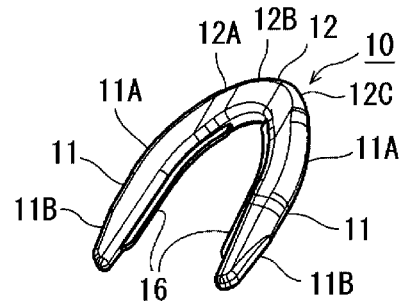
FIG. 11F is a perspective view thereof.

As illustrated in FIGS. 11A to 11F, the pair of ribs 16 are provided on inner sides of the pair of leg portions 11 and on an inner side of a part of the central portion 12. Specifically, as illustrated in FIG. 11E and the like, the pair of ribs 16 are provided on the inner sides of the pair of leg portions 11 that are provided in parallel to each other, and on inner sides of the one end portion 12A and the other end portion 12C of the central portion 12 which are provided in parallel to each other.

That is, one of the ribs 16 is provided so as to be continuous at the inner side of one leg portion 11 of the pair of leg portions 11 and the inner side of the one end portion 12A of the central portion 12. The other rib 16 is provided so as to be continuous at the inner side of the other leg portion 11 of the pair of the leg portions 11 and the inner side of the other end portion 12C of the central portion 12.

Figure 12A:
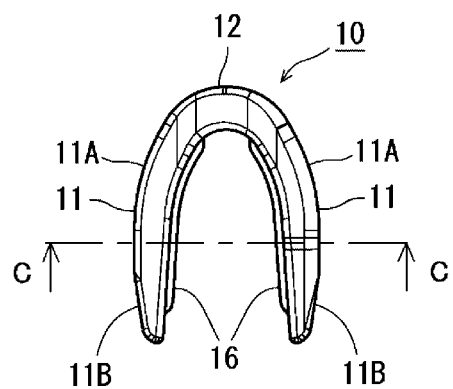
FIG. 12A is the front view of the binding tool according to the fifth modification.
Figure 12B:
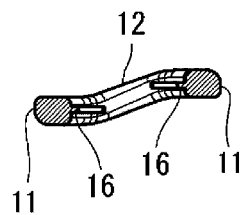
FIG. 12B is a cross-sectional view thereof taken along a line C-C in FIG. 12A.

Accordingly, the pair of ribs 16 are provided so as to avoid the inclined portion 12B of the central portion 12 which extends obliquely with respect to the bending direction D2 of the pair of leg portions 11. Therefore, as illustrated in FIG. 11E and FIG. 12B, the pair of ribs 16 are provided in parallel to each other, and are arranged to be deviated from each other in the front-rear direction as viewed in the thickness direction D1.

Figure 13A:
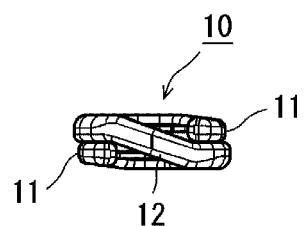
FIG. 13A is a plan view of a binding state of the binding tool according to the fifth modification.
Figure 13B:
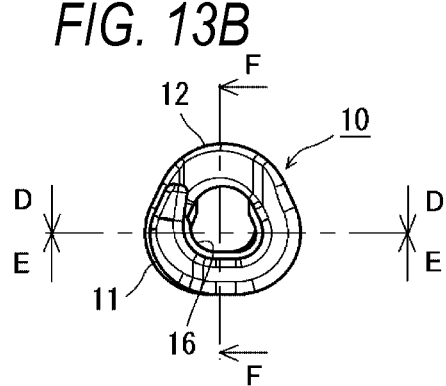
FIG. 13B is a front view thereof.
Figure 13E:
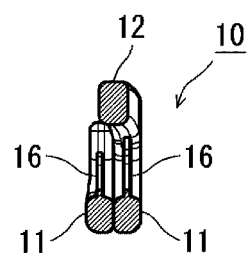
FIG. 13E is a cross-sectional view thereof taken along a line F-F in FIG. 13A.
Figure 13C:
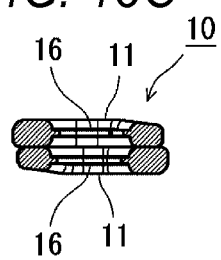
FIG. 13C is a cross-sectional view thereof taken along a line D-D in FIG. 13A.
Figure 13D:
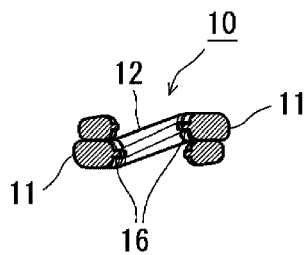
FIG. 13D is a cross-sectional view thereof taken along a line E-E in FIG. 13A.
Figure 14A:
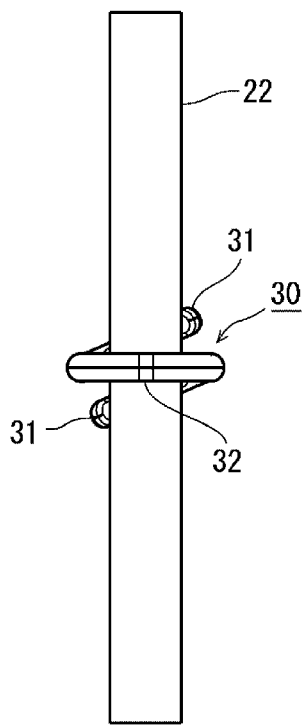
FIG. 14A is a plan view of a state where an object to be bound is bound by a related-art binding tool.
Figure 14B:
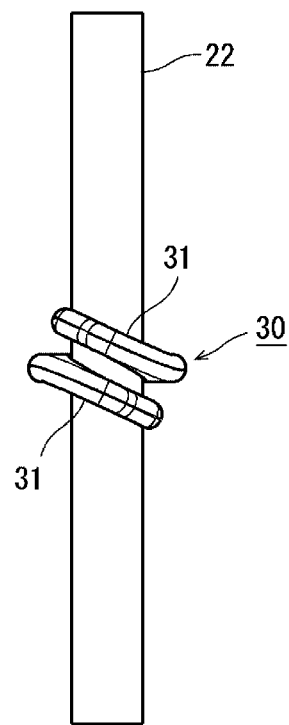
FIG. 14B is a bottom view thereof.
Figure 14C:
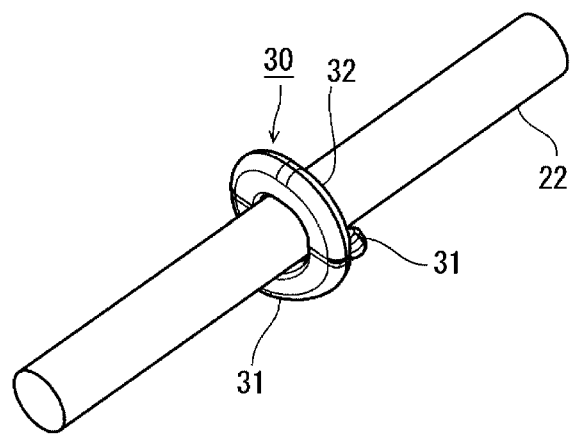
FIG. 14C is a perspective view thereof.

When the binding is performed using such a binding tool 10, a strong holding force can be exerted since the two ribs 16 bite into the object to be bound 22. At this time, as illustrated in FIGS. 13C to 13E, the two ribs 16 bite into the object to be bound 22 in a state of being parallel to each other. Further, the two ribs 16 are perpendicular to the object to be bound 22 (not inclined with respect to the axis of the object to be bound 22). Therefore, even if the binding tool 10 rotates around the object to be bound 22, a position at which the ribs 16 bite is not changed. Therefore, it is possible to prevent the binding from becoming loosened due to deviation of the position of the binding tool 10 after the binding which is caused by rotation thereof.

In this modification, the rib 16 is provided only on the inner sides of the pair of leg portions 11 and on the inner sides of the one end portion 12A and the other end portion 12B of the central portion 12, but the present invention is not limited thereto, and the rib 16 may also be formed on an inner side of the inclined portion 12B of the central portion 12. By forming the rib 16 also on the inclined portion 12B of the central portion 12, a length of the rib 16 biting into the object to be bound 22 can be increased, and the holding force can be increased.

Instead of providing the rib 16, the inner sides of the leg portions 11 may be formed to have a cross-section of an acute angle so that the position to contact with the object to be bound 22 is in an acute angle. However, in a case of such an aspect, it is difficult to control a biting amount, and the object to be bound 22 may be damaged. In this respect, in a case of an aspect where the rib 16 is provided, the biting amount can be easily controlled by simply matching a height of the rib 16 with the object to be bound. For example, when the object to be bound 22 is a harness, by providing the rib 16 to have a height smaller than a thickness of a coating portion of the harness, a cable body can be prevented from being damaged even when the rib 16 bites into the coating portion of the harness. Therefore, it is desirable to provide the rib 16 that makes it easy to control the biting amount and that is less likely to damage the object to be bound 22.

This application is based on Japanese Patent Application No. 2018-022389 filed on Feb. 9, 2018, the contents of which are incorporated herein by reference.

REFERENCE SIGNS LIST 10 binding tool, 11 leg portion, 11A root portion, 11B tip portion, 12 central portion, 12A one end portion, 12B inclined portion, 12C the other end portion, 13 first curved portion, 14 second curved portion, 15 third curved portion, 16 rib, 20 coupled binding tool, 21 coupling portion, 22 object to be bound, 30 related-art binding tool, 31 leg portion, 32 central portion, D1 thickness direction, D2 bending direction, D3 coupling direction, T1 thickness of tip of leg portion, T2 thickness of root of leg portion

The invention claimed is:
1. A binding tool comprising:
a pair of leg portions, each of the pair of leg portions including a single tip portion; and
a central portion that is provided between the pair of leg portions, wherein
the binding tool is formed in a horseshoe shape and is capable of binding an object to be bound by bending the pair of leg portions inward, and
the pair of leg portions are offset from each other in a thickness direction before the binding tool binds the object to be bound.

2. The binding tool according to claim 1, wherein
tips of the pair of leg portions are offset so as not to overlap each other when viewed in a bending direction of the pair of leg portions.

3. The binding tool according to claim 1, wherein
the pair of leg portions are arranged to be deviated from each other in a front-rear direction by a distance larger than a thickness of a tip of the pair of leg portions as viewed in the thickness direction.

4. The binding tool according to claim 1, wherein
the central portion connects the pair of leg portions in a non-axisymmetric manner.

5. The binding tool according to claim 1, wherein
the central portion extends obliquely with respect to the thickness direction.

6. The binding tool according to claim 1, wherein
a step is formed in the central portion such that the pair of leg portions are alternately arranged by displacing one leg and the other leg from each other as illustrated in a plan view.

7. The binding tool according to claim 1, further comprising:
a first curved portion formed on an inner side of the central portion;
a second curved portion formed to be continuous with both sides of the first curved portion; and
a third curved portion formed to be continuous with the second curved portion, wherein a curvature of the first curved portion is larger than a curvature of the second curved portion, and
the curvature of the second curved portion is larger than a curvature of the third curved portion.

8. The binding tool according to claim 7, wherein
the third curved portion is formed to be longer than the second curved portion.

9. A coupled binding tool comprising:
a plurality of binding tools according to the binding tool of claim 1 that are coupled, wherein
a coupling portion is provided to the central portion of each of the binding tools,
the binding tools adjacent to each other are coupled by the coupling portion, and
the pair of leg portions of each of the binding tools are arranged to be deviated from each other in a front-rear direction as viewed in a coupling direction.

10. The coupled binding tool according to claim 9, wherein
the coupled binding tool is formed asymmetrically as viewed in the coupling direction.

11. The binding tool according to claim 1, wherein
the pair of leg portions are formed so as to gradually decrease in thickness toward tips thereof.

12. The binding tool according to claim 2, further comprising:
a first curved portion formed on an inner side of the central portion;
a second curved portion formed to be continuous with both sides of the first curved portion; and
a third curved portion formed to be continuous with the second curved portion, wherein
a curvature of the first curved portion is larger than a curvature of the second curved portion, and
the curvature of the second curved portion is larger than a curvature of the third curved portion.

13. The binding tool according to claim 3, further comprising:
a first curved portion formed on an inner side of the central portion;
a second curved portion formed to be continuous with both sides of the first curved portion; and
a third curved portion formed to be continuous with the second curved portion, wherein
a curvature of the first curved portion is larger than a curvature of the second curved portion, and
the curvature of the second curved portion is larger than a curvature of the third curved portion.

14. The binding tool according to claim 12, wherein
the third curved portion is formed to be longer than the second curved portion.

15. The binding tool according to claim 13, wherein
the third curved portion is formed to be longer than the second curved portion.

16. The binding tool according to claim 7, wherein
an opening is formed between the pair of leg portions, and
curvatures of inner sides of the pair of leg portions gradually decrease as approaching the opening.

17. The binding tool according to claim 12, wherein
an opening is formed between the pair of leg portions, and
curvatures of inner sides of the pair of leg portions gradually decrease as approaching the opening.

18. The binding tool according to claim 13, wherein
an opening is formed between the pair of leg portions, and
curvatures of inner sides of the pair of leg portions gradually decrease as approaching the opening.

19. The binding tool according to claim 1, wherein
the thickness direction is a direction perpendicular to two mutually parallel planes sandwiching the binding tool and having a minimum distance therebetween.

* * * * *